Figure 1:
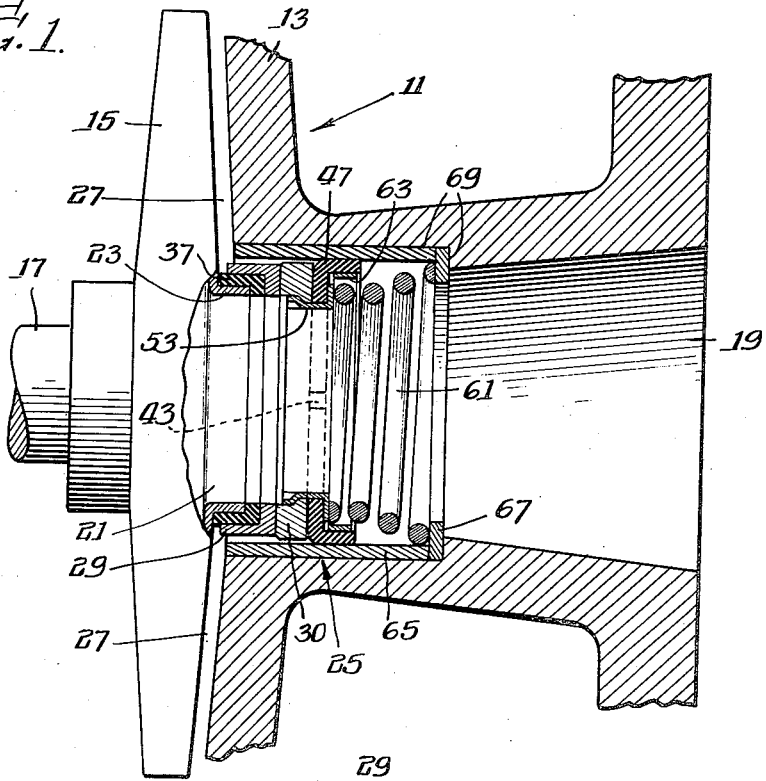

July 22, 1941.  W. W. MEYER  2,250,311

SEAL

Filed March 16, 1938

INVENTOR.
Walter W. Meyer
By:- Cox & Moore
ATTORNEYS.

UNITED STATES PATENT OFFICE 2,250,311

SEAL

Walter W. Meyer, Arlington Heights, Ill., assignor to Rotary Seal Company, Chicago, Ill., a corporation of Illinois Application March 16, 1938, Serial No. 196,232

3 Claims. (Cl. 286—7)

My invention relates in general to seals and sealing, and has more particular reference to the provision of improved means for sealing pumps having rotating impellers against leakage between the intake and discharge sides of the pump.

An important object of the present invention is to provide for sealing the impeller of a pump against leakage between the intake and discharge sides of the pump, wherein the impeller comprises rotary means having an annular path of possible leakage surrounding the path taken by the work material in traveling to the impeller.

An other important object resides in providing a seal for rotary pumps and the like, wherein the work medium is delivered to a rotating impeller substantially at the axis thereof through an inlet opening, and wherein an annular seal through which the work medium travels to the impeller is required between the means forming the intake opening and the impeller in order to seal the intake from the discharge side of the pump.

Another important object is to provide a seal of the character mentioned, including the provision of an annular seal seat resiliently mounted on the impeller at an inlet opening thereof and adapted to rotate with the impeller in combination with stationary sealing means in position to cooperate with said seal seat, and yieldingly mounted on the pump casing; a further object being to form the cooperating stationary sealing means as a composite element, including a bearing ring and an associated annular sealing diaphragm of soft, flexible material, whereby to yieldingly seal the bearing element on the stationary portions of the pump casing in position to form a running seal with a cooperating seal seat preferably resiliently mounted upon the impeller of the pump.

Another important object is to provide a seal including bearing elements adapted to cooperate in the formation of a running seal and, respectively, carried on relatively movable parts to be sealed, both of said bearing elements preferably being resiliently mounted and sealed on the relatively movable elements carrying the same.

Another important object is to provide simplified means for interconnecting a bearing element and a cooperating sealing element to provide a composite seal assembly adapted to be mounted in position forming an annular seal within a channeled element.

Another important object is to provide a seal comprising an assembly unit to facilitate mounting in a channel element, said assembly including a cage or casing adapted for press-fitting in the channel element and containing sealing means including an annular bearing element, an annular flanged diaphragm, means to drivingly connect said parts together to resist relative angular movement therebetween, and means to seal the diaphragm upon the inner surfaces of said cage.

Another important object is to utilize the flexibility of an annular flange diaphragm to provide a sealing effect in a channel element to be sealed.

These and numerous other important objects, advantages and inherent functions of the invention will become apparent as the same is more fully understood from the following description, which, taken in connection with the accompanying drawing, discloses a preferred embodiment of the invention.

Figure 2:
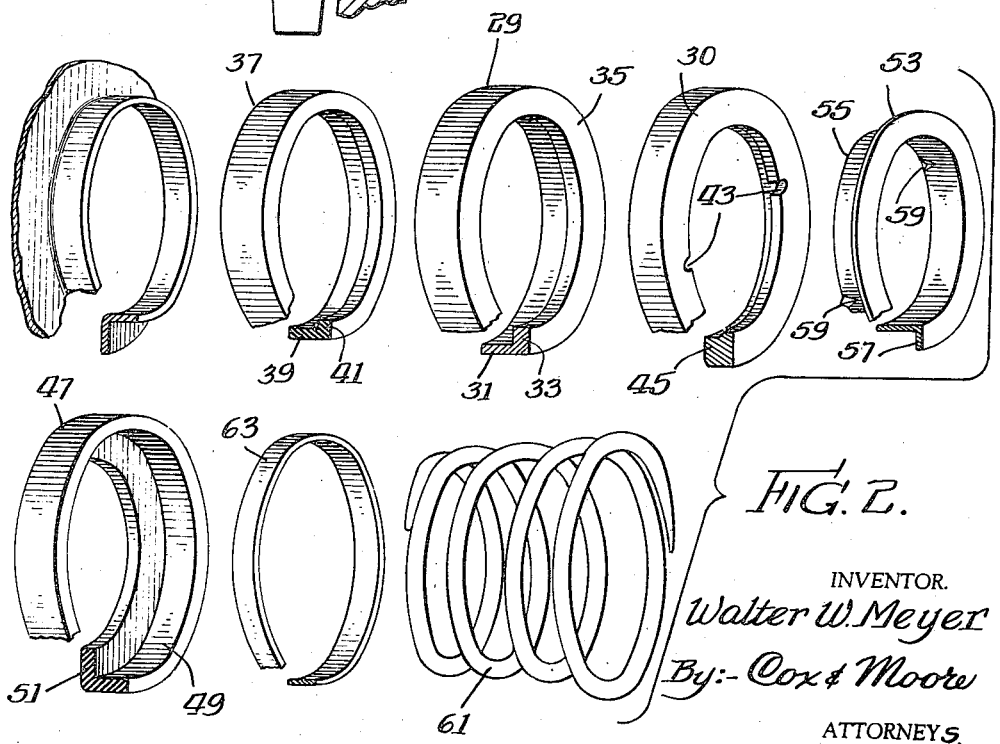

Referring to the drawing,

Figure 1 is a partial section through a pump containing a seal embodying my present invention; and Figure 2 is an assembly view showing in perspective the parts forming the seal illustrated in Figure 1.

To illustrate my invention, I have shown on the drawing fragments of a pump 11 comprising a casing 13 having an impeller 15 mounted for rotation within the casing, as on a shaft 17. The casing 13 is formed with the intake opening 19 and the impeller is of the centrifugal type having an inlet 21 concentric with respect to the impeller shaft 17 in position communicating with the intake opening 19.

The impeller 15 may comprise any suitable centrifugal construction and may be formed as a light-weight casting or of sheet metal, or otherwise. The impeller inlet opening 21, however, is preferably defined by an outstanding flange 23 extending in the inner end of the intake opening 19, and I have provided improved sealing means 25 comprising the several elements illustrated in Figure 2, for the purpose of separating the channel, defining the intake 19, from the portions 27 within the casing into which the impeller discharges the work medium as by centrifugal action. To this end, the seal 25 closes and seals the annular space defined between the channel forming the intake 19 and the outstanding flange defining the impeller inlet 21, and it will be seen, therefore, that my present invention fundamentally provides an annular seal between the relatively moving conduit portions which define the intake opening 19 and the impeller inlet 21, the seal necessarily permitting the passage of work material from the conduit 19 through the annular sealing device and into the conduit 21.

To accomplish the purposes of my present invention, the seal 25 comprises a pair of bearing elements having cooperating faces adapted to form a running fit, one of the bearing elements being adapted for mounting on the casing 13 in the channel 19, and the other being adapted for mounting on the impeller, preferably at the flange 23. To this end, the bearing elements comprise an annular seat-forming ring 29 and a sealing ring 30. The seat-forming element 29 may be formed of any suitable bearing material and comprises preferably a cylindrical portion 31 and an offset, flat flange portion 33 at one end of the cylindrical portion and forming a seal seat 35.

Means for mounting the element 29 upon the impeller 15 is provided, said means preferably affording a resilient mounting for the bearing element 29 and comprising, in the illustrated embodiment, an annular packing ring 37 of resilient, preferably rubber-like material formed with a cylindrical portion 39 and an offset flange portion 41 at one end of the cylindrical portion 39.

The packing ring 37 may comprise any suitable packing material, but I prefer to use synthetic rubber. The ring 37 is of a size to snugly fit upon the flange 23 of the impeller which defines the opening 21, with the cylindrical portion 39 snugly embracing the outer surfaces of the flange 23, while the offset portion 41 of the ring overlies the end edge of the flange 23.

The seat-forming element 29 may be secured in position on the flange 23 by pressing the same over the resilient mounting ring 37, with the cylindrical portion 31 of the element 29 embracing the outer surfaces of the cylindrical portion 39, while the offset seat-forming portion 33 of the element 29 overlies the offset portion 41 of the ring 37. The cylindrical portion 39 of the packing ring is thus held in compression by and between the cylindrical flange 23 of the impeller and the cylindrical flange 31 of the seat-forming element which is thus firmly, though resiliently, supported on the impeller and at the same time sealed thereon by the packing ring. The parts, however, may be easily applied merely by wetting the resilient packing element 37 and pressing it in place upon the flange 23, the outer surfaces of which are preferably finished smooth and cleaned before applying the packing ring, and then the seat-forming element 29 may be pressed in place upon the packing ring.

The sealing ring 30 may be formed of any suitable, preferably self-lubricating bearing material, and is formed on one side with a sealing surface 45 adapted to form a running contact with the seating surface 35 of the bearing element 29. Means is provided for sealing the ring 30 in preferably yielding or resilient fashion within the channel forming the intake 19. In the illustrated embodiment this is accomplished by means of an annular diaphragm 47 of preferably soft, flexible sealing material and having a cylindrical portion 49 adapted to snugly and frictionally engage the inner surfaces of the channel 19, and a portion 51 adapted to sealingly engage an annular surface of the sealing ring 30, the portion 51 preferably comprising a flat flange offset at one end of the cylindrical flange portion 49. The diaphragm 47 preferably comprises synthetic rubber, although any suitable rubber-like or other flexible sealing material may be used.

The sealing elements 30 and 47 are preferably, though not essentially, secured together in a fashion tending to prevent relative rotation therebetween. To this end I provide a preferably sheet-metal retaining shell 53 having a cylindrical portion 55 adapted to extend within the ring 30 and through the opening defined by the annular portion 51 of the diaphragm 47.

The shell 53 is also provided with an outstanding annular flange 57 adapted to embrace and frictionally engage the portion 51 of the diaphragm. The cylindrical portion 55 of the shell is provided with out-struck ears 59 in position to pass through grooves 43 formed on the inner annular surface of the ring 30, and the ring may be cut away to form an annular seat for receiving the ears by relatively turning the ring 30 and shell 53 in order to snugly hold the ring 30 against the flange 51 of the packing, so that the shell 53 is drivingly connected with the ring 30 in a manner preventing relative angular movement therebetween, while the frictional engagement between the flange 57 of the shell and the flange 51 of the diaphragm tends to prevent relative rotation between the shell and the diaphragm.

This frictional resistance to turning movement may be augmented by means of a spring 61 adapted for arrangement within the channel 19 in compression, the spring seating at one end upon a suitable shoulder formed in the pump casing in the channel 19, and having its other end pressing upon the flange 51 as by engaging said end of the spring with the overlying flange 57 of the shell, in order to increase the frictional driving engagement between the flanges 51 and 57, to press the flange 51 into tight sealing engagement upon the ring 30 and in turn to urge the ring 30 against the seat 35 of the element 29, to thereby provide tight seals between all of the parts.

I prefer, also, to provide a cylindrical, annular, preferably metallic, expanding band 63 and to assemble the same within the cylindrical portions 49 of the diaphragm 47, in order to insure a tight sealing fit between the cylindrical portions of the diaphragm and the inner surfaces of the channel 19 to assure a tight seal therebetween.

I prefer to assemble the parts 29, 30, 47, 53, 61 and 63 in a cage to facilitate insertion of these parts as a unit in position in the channel 19. To this end, I provide a cage comprising a cylindrical shell 65 and an end ring 67, the parts being assembled, as shown in Figure 1, with the spring 61 pressing at one end upon the end ring 67, and at the other upon the sealing unit comprising the elements 29, 30, 47, 53 and 63 which likewise may be assembled as a unit to facilitate manufacture. When the parts are so assembled as a unit in the cylindrical cage, the pump casing 13 may be formed with a seat 69, sized to receive the cage and its contents simply by pressing the cage into place in the seat 69. It is a simple matter to press-fit the cage in position and by providing the cage as a part of the unit I am able to insure that the interior surfaces thereof are smoothly finished and provide for a tight seal between the diaphragm 47 and the inner surfaces of the cage, without relying upon the skill of the operator who assembles the seal or upon the character of the material forming the housing 13. The seal, however, is well-adapted for application without providing a special cylindrical insert 65 in the pump casing merely by smoothing out the channel 19 sufficiently to enable the diaphragm 47 to form tight contact with the inner surfaces of the intake channel.

When the seal is in operation, the rotating impeller carries the seat-forming element 29 in a resilient fashion by virtue of the packing ring 37 so that the element 29, to a limited extent, has self-aligning characteristics. The seating element 29 rotates against the sealing surface 45 of the sealing ring 30 to form a running fit therewith. The sealing ring 30 also is self-aligning within the intake channel 19 by virtue of the flexibility of the diaphragm element 47, so that at all times the bearing elements 29 and 30 form a perfect running seal between the faces 35 and 45, regardless of the alignment of the shaft 17 or of wobble due to wear, inaccurate alignment of shaft bearings or through unbalanced distribution of weight in the impeller.

The spring 61 serves to maintain the parts in position forming a snug running fit between the bearing elements and automatically accommodates for any wear of the surfaces 35 and 45, the diaphragm 47 being adapted to yield and also to creep slightly in an axial direction within the channel 19 without, however, impairing the sealing effect between the diaphragm and the surface on which it seats. A running seal is provided between the parts 29 and 30. At all other points, however, the seals are stationary, that is to say, a stationary seal is formed between the diaphragm and the surfaces of the channel 19, between the diaphragm and the ring 30, and between the ring 29 and the impeller flange 23. Where an insert sleeve 65 is utilized, the press-fit between it and the surfaces of the seat 69 insure against leakage therebetween.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. A seal for a pair of relatively rotatable channeled members including a rimmed member formed with an annular rim defining the opening of its channel and disposed with said rim facing into the end of the channel of the other member, said seal comprising an annular seal element forming an annular seal seat, an annular collar of elastic material on said rim and yieldingly sealing and mounting said annular seal element at the opening of the channel of the rimmed member, means forming a cylindrical seal seat in the channel of said other member and an annular abutment adjacent said cylindrical seat, annular seal means having a resilient portion in position to sealingly engage said cylindrical seal seat, said seal means being movable on said other member longitudinally of the channel thereof, and helical spring means bearing at one end on said abutment and at the other end on said annular seal means to yieldingly urge the same longitudinally of said cylindrical seat and into engagement with the annular seal seat to form a running seal therewith.

2. A seal for a pair of relatively rotatable channeled members including a rimmed member formed with an annular rim defining the opening of its channel and disposed with said rim facing into the end of the channel of the other member, said seal comprising an annular seal element forming an annular seal seat, an annular collar of elastic material on said rim and yieldingly sealing and mounting said annular seal element at the opening of the channel of the rimmed member, means forming a cylindrical seal seat in the channel of said other member and an annular abutment adjacent said cylindrical seat, annular seal means comprising an annular ring having a sealing surface adapted to engage and form a running seal with said annular seal seat, a gasket of resilient rubber-like material having a marginal skirt, forming a resilient portion in position to sealingly engage the cylindrical seat, an inwardly extending flange portion in position to overlie the side of said ring opposite from the sealing surface thereof, an annular clip engaging said ring and embracing the inwardly extending flange of said resilient gasket to retain said parts together as an assembled unit, said annular seal means being movable on said other member longitudinally of the channel thereof, and helical spring means bearing at one end on said abutment and at the other end on said annular seal means to yieldingly urge the same longitudinally of the cylindrical seat and into engagement with the annular seat to form a running seal therewith.

3. A seal for a pair of relatively rotatable channeled members including a rimmed member formed with an annular rim defining the opening of its channel and disposed with said rim facing into the end of the channel of the other member, said seal comprising an annular seal element forming an annular seal seat, an annular collar of elastic material on said rim and yieldingly sealing and mounting said annular seal element at the opening of the channel of the rimmed member, means forming a cylindrical seal seat in the channel of said other member and an annular abutment adjacent said cylindrical seat, annular seal means comprising an annular ring having a sealing surface adapted to engage and form a running seal with said annular seal seat, a gasket of resilient rubber-like material having a marginal skirt, forming a resilient portion in position to sealingly engage the cylindrical seat, an inwardly extending flange portion positioned to engage the side of said ring opposite from the sealing surface thereof, an annular pressing ring disposed within said skirt for holding the same in sealing engagement with the cylindrical seat, said annular seal means being movable on said other member longitudinally of the channel thereof, and helical spring means bearing at one end on said abutment and at the other end on said annular seal means to yieldingly urge the same longitudinally of the cylindrical seat and into engagement with the annular seat to form a running seal therewith.

WALTER W. MEYER.